United States Patent [19]

Ostrowski

[11] 4,089,392
[45] May 16, 1978

[54] SELF-ENERGIZING DISC BRAKES AND ACTUATOR THEREFOR

[75] Inventor: Piotr Ostrowski, Sutton Coldfield, England

[73] Assignee: Girling Limited, Birmingham, England

[21] Appl. No.: 764,530

[22] Filed: Jan. 31, 1977

[30] Foreign Application Priority Data

Jan. 29, 1976 United Kingdom .................. 3461/76

[51] Int. Cl.² ............................................. F16D 55/14
[52] U.S. Cl. .................................... 188/71.4; 92/108;
92/129; 92/130 A; 92/165 PR; 188/71.7;
188/72.2; 188/72.6; 188/106 F; 188/196 M;
188/369; 192/70; 192/83
[58] Field of Search ..................... 188/71.7, 71.3, 71.4,
188/72.2, 72.6, 106 F, 365, 369, 196 M; 192/70,
70.25, 83; 92/130 A, 165 PR, 108, 114, 129, 165 R

[56] References Cited

U.S. PATENT DOCUMENTS

| 3,036,668 | 5/1962 | Falk et al. ................... 188/196 M X |
| 3,245,499 | 4/1966 | Kershner ..................... 188/71.4 |
| 3,508,469 | 4/1970 | Williams ...................... 92/130 AX |
| 3,543,886 | 12/1970 | Campbell ..................... 188/71.4 |
| 3,701,399 | 10/1972 | Airheart ...................... 188/72.6 X |
| 3,848,704 | 11/1974 | Falk ............................. 188/106 F X |
| 4,004,657 | 1/1977 | Ostrowski .................... 188/365 X |

FOREIGN PATENT DOCUMENTS

| 2,306,630 | 9/1974 | Germany ..................... 92/165 PR |
| 1,277,345 | 6/1972 | United Kingdom .......... 188/71.4 |

Primary Examiner—George E. A. Halvosa
Attorney, Agent, or Firm—Scrivener, Parker, Scrivener and Clarke

[57] ABSTRACT

In a disc brake in which the brake applying mechanism is actuated by movement of a first pull rod, the hydraulic actuator which effects movement of the pull rod comprises an assembly of piston and cylinder members of which one is rigidly fixed with respect to a housing and the other is movable relative thereto and acts on the first pull rod. A second pull rod is coupled to the first pull rod and is used for parking or emergency braking.

16 Claims, 7 Drawing Figures

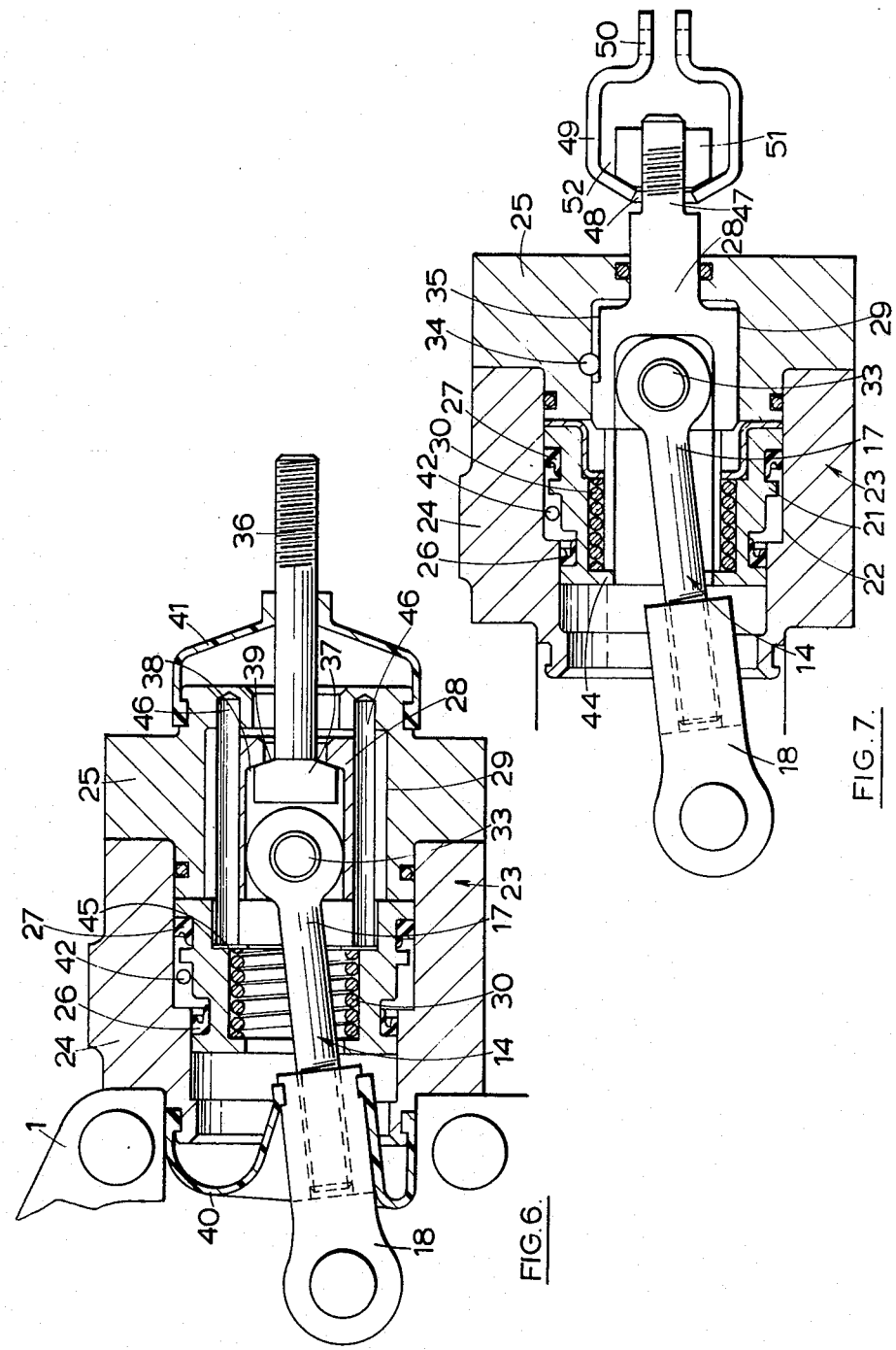

SELF-ENERGIZING DISC BRAKES AND ACTUATOR THEREFOR

SPECIFIC DESCRIPTION

This invention relates to improvements in vehicle brakes of the kind comprising co-operating friction members having relatively rotatable friction surfaces which are urged into engagement when the brake is applied by means of brake applying means actuated by a first pull-rod which projects from a relatively stationary housing in which the friction members are incorporated.

In known brakes of the kind set forth the pull-rod is normally operated by hydraulically-operated means for normal service braking, and mechanically by mechanically operable means for parking or emergency braking. It is desirable to combine the hydraulically-operable means and the mechanically-operable means into a single assembly, but difficulty arises in preventing one of the said means from affecting the other when one of the said means is operated on its own.

According to our invention in a brake of the kind set forth movement of the first pull-rod in a brake applying direction for normal service braking is effected by an hydraulic actuator comprising an assembly of piston and cylinder members of which one is rigidly fixed with respect to the housing and the other which is movable relative thereto acts on the first pull-rod, and for parking or emergency braking movement of the first pull-rod in the brake applying direction is effected by means of a second pull-rod coupled to the first.

Preferably the movable member acts on the first pull-rod through an abutment member with which the movable member is in freely separable engagement and which is guided for movement in a direction substantially at right angles to the axis of the brake, and the second pull-rod is coupled to the abutment member through a lost-motion connection.

This has the advantage that the second pull-rod is unaffected when the brake is operated by the movable member, and the movable member is unaffected when the brake is operated by the second pull-rod.

Preferably the abutment member is keyed against rotation with respect to the fixed member and is coupled to the first pull-rod through a pivotal thrust coupling which allows movement of the first pull-rod relative to the abutment member in one plane only of the brake.

The first pull-rod may comprise first and second screw-threaded parts which are relatively rotatable to alter the effective length of the first pull-rod, and the fixed member may comprise a first part, and a second part releasable from the first and to which the abutment member is keyed against rotation. Thus the effective length of the first pull-rod can be adjusted by releasing the second part of the fixed member and rotating it with respect to the first.

Some embodiments of our invention will now be described by way of example with reference to the accompanying drawings, in which:

FIG. 6 is a longitudinal section through an actuator assembly similar to that illustrated in FIG. 5; and FIG. 7 is similar to FIG. 6 but showing a modification.

Figure 1:
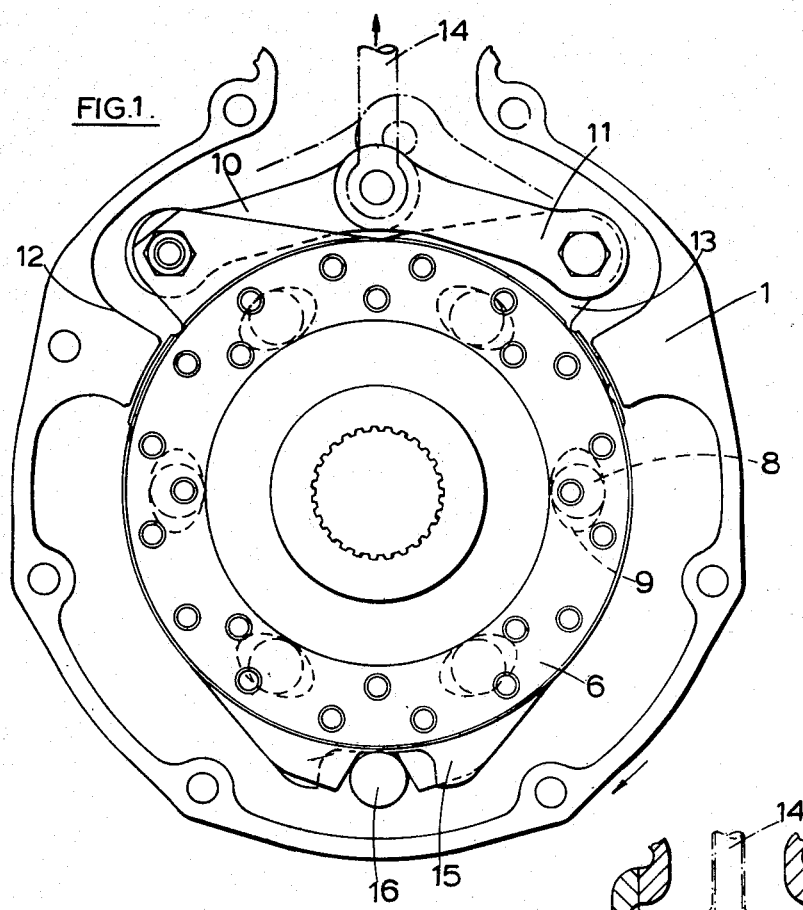
FIG. 1 is a transverse section through a brake of the self-energising spreading type.
Figure 2:
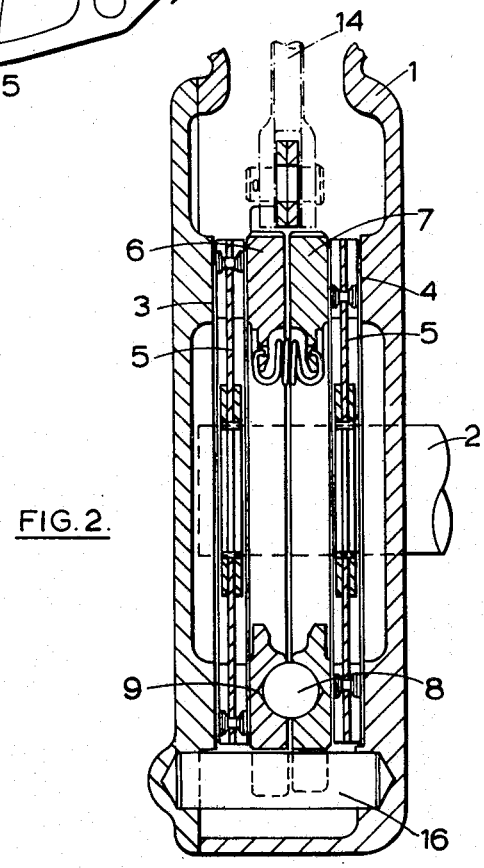
FIG. 2 is a longitudinal section through the brake shown in FIG. 1.

The self-energising spreading type of brake illustrated in FIGS. 1 and 2 is adapted for braking a shaft for transmitting drive to a wheel of a vehicle. The brake comprises a housing 1 into which the shaft 2 extends, the housing having axially spaced radial braking surfaces 3, 4 between which are located rotatable friction discs 5. The discs 5 are slidably keyed to the shaft 2.

Two angularly movable pressure plates 6 and 7 in the form of rings are located between the pair of discs 5 and balls 8 are located in oppositely inclined co-operating recesses 9 in adjacent faces of the plates 6, 7.

A pair of toggle links 10, 11 are connected to radially projecting lugs 12, 13 on the plates 6, 7 and one end of a pull-rod 14 is connected to the junction of the links 10, 11. The other end of the pull-rod 14 is mounted in an actuator assembly for initiating application of the brake as shown in any of FIGS. 3 to 7.

Movement of the pull-rod 14 in the brake applying direction is effected by the actuator assembly and initiates angular movement of the pressure plates 6, 7 in relatively opposite directions. The balls 8 then tend to ride out of the recesses 9 and urge the plates apart into engagement with the friction discs 5 which are then urged into engagement with the radial surfaces 3, 4 in the housing. The pressure plates 6, 7 are carried round with the discs 5 until one of the plates for example the plate 6 is arrested by the engagement of a lug 15 on that plate with a pin 16 which acts as a stop abutment. Continued angular movement of the other pressure plate 7, known as the energising plate, provides a servo action to intensify the braking force.

The actuator assemblies shown in FIGS. 3 to 7 may be incorporated in the self-energising spreading type of brake shown in FIGS. 1 and 2 or in any other brake of the kind including relatively rotatable friction members urged into engagement with friction surfaces when the brake is applied.

Figures 3, 4:
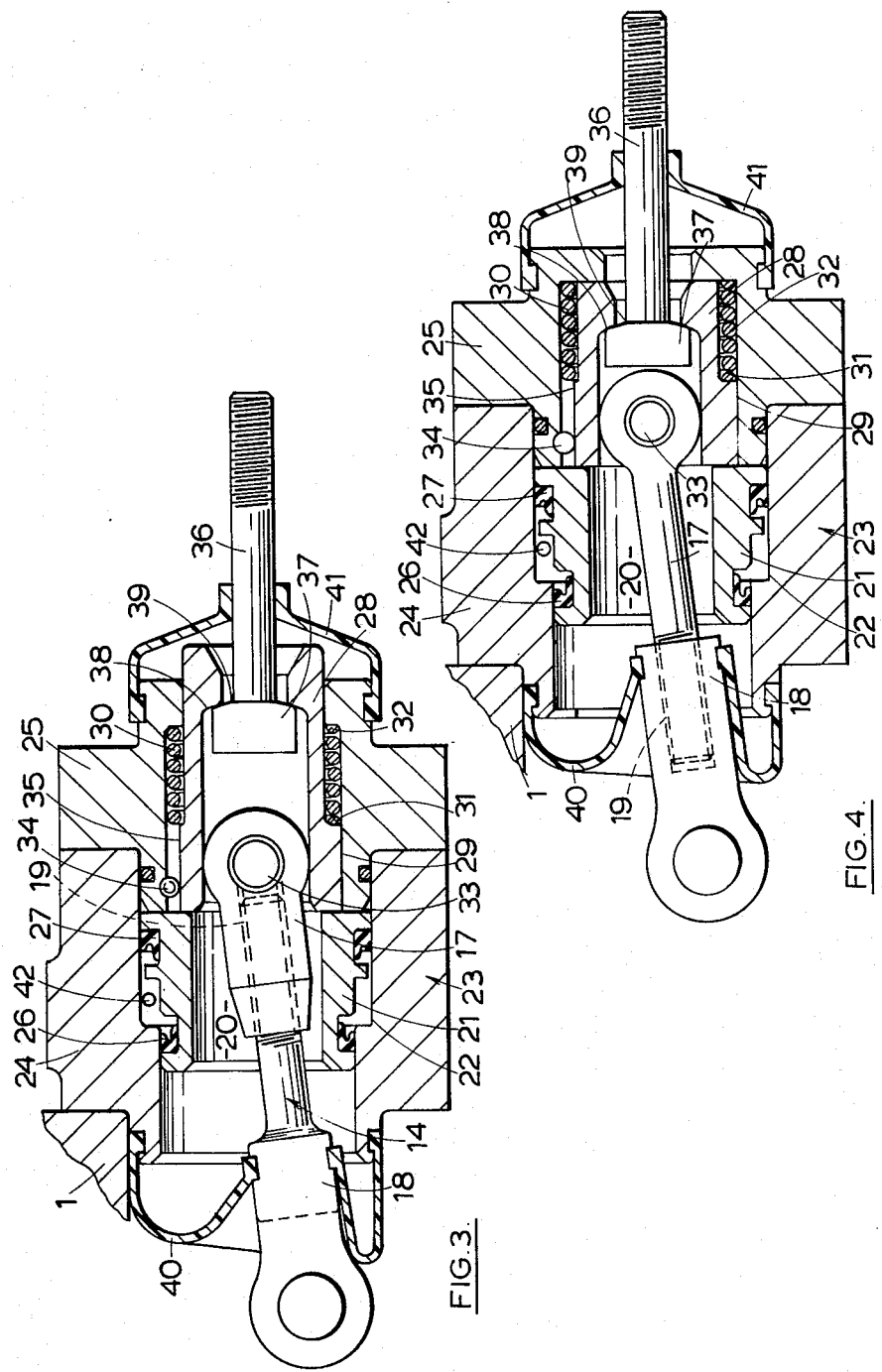
FIG. 3 is a longitudinal section of an actuator assembly for a brake of the kind set forth, in the advanced brake-applying position.
FIG. 4 is similar to FIG. 3 but showing a modification.

In the actuator assembly illustrated in FIG. 3 the first pull-rod 14 comprises an outer part in the form of a trunnion and an inner part 18 screwed at its outer end into a threaded bore 19 in the inner end of the trunnion 17. The inner part 18 is adapted at its inner end to be coupled to the junction of the two toggle links 10, 11 attached to the pressure plates 6, 7 of the brake as shown in FIGS. 1 and 2.

The rod 14 passes axially through a hollow bore 20 providing substantial clearance for the rod in a differential piston 21 working in a stepped cylinder bore 22 in a cylinder body 23 rigidly secured to the stationary housing 1 of the brake. The cylinder body comprises an inner part 24 secured to the housing 1 and an outer end part 25 sealed to the inner part and detachably secured to the inner part 24 by bolts (not shown) which are relatively offset so that the end part 25 can be assembled to the inner part 24 only in either of two positions relatively displaced by 180°.

The piston 21 is sealed by spaced seals 26 and 27 which it carries and which are slidable in the bore 22.

An abutment member 28 of generally cylindrical outline having a stepped bore with the end of greater diameter adjacent to the piston 21 is slidably guided in a bore portion 29 of stepped outline in the end part 25. The portion 29 is of greater diameter than the bore 20 so that the inner end of the abutment member 28 which is of greater diameter is normally urged into freely separable engagement with the piston 21 by means of a compression spring 30 acting between shoulders 31 and 32 at the steps in diameter of the abutment member 28 and the bore 29 respectively.

The trunnion 17 of the pull-rod 14 is coupled to the abutment member 28 by means of trunnion pins 33 which are pivotally received in part-cylindrical grooves in the abutment member 28 so that the pull-rod 14 can rock about the abutment member 28 and the piston 21 only in a single plane. Also the abutment member 28 is keyed against rotation relative to the end part 25 by means of a spring pin 34 which engages with a milled flat 35 on the abutment member 28 arranged so that, in turn, the plane about which the pull-rod can rock is normal to the axis of the brake relative to which the trunnion pins 33 are parallel.

A second pull-rod 36 for connection to a manually-operable brake applying lever (not shown) has at its inner end an enlarged head 37 engaging with a shoulder 38 at the step in diameter of the bore of the abutment member 28. Both the shoulder 38 and the surface 39 of the head which engages with it are of part-spherical outline to provide a part-spherical rocking coupling therebetween. The head 37 is a loose fit in the larger diameter portion of the bore of the abutment member 28.

Both the outer part 17 of the pull-rod 14 and the pull-rod 36 are sealed to the cylinder body against the ingress of dirt by means of sealing boots 40 and 41 respectively.

For normal service operation the brake is actuated hydraulically by pressurising a space between the seals 26 and 27 through an inlet port 42. This urges the piston 21 away from the brake and into the advanced brake-applying position shown, urging with it the abutment member 28 which in turn, withdraws the pull-rod 14 to operate the toggle links 10, 11 (see FIG. 1). During movement of the abutment member 28, the pull-rod 36 is unaffected with the abutment member moving with respect to the head 37.

To apply the brake mechanically, the pull-rod 36 is withdrawn by operation of the brake applying lever and, in turn, acts through the abutment member 28 to withdraw the pull-rod 14. Since the abutment member 28 separates from the piston 21, the hydraulic operating means is unaffected.

When the brake applying means is released the abutment member 28 is restored to a retracted position by operation of the compression spring 30.

To adjust the actuator to compensate for wear of the friction linings of the brake, the bolts securing the end part 25 of the cylinder body to the inner part 24 are removed and the end part 25 is rotated relative to the inner part 24 through 180° or a complete turn to impart a corresponding rotational movement to the trunnion 17. Since the inner part 18 of the pull-rod 14 is held against rotation by the toggle links, 10, 11 the effective length of the pull-rod 14 is thereby reduced.

In the modified construction of FIG. 4 the threaded bore 19 is provided in the inner part 18 of the pull-rod 14 into which the free end of the trunnion 17, which is threaded, is screwed.

The construction and operation is otherwise the same and corresponding reference numerals have been applied to corresponding parts.

Figure 5:
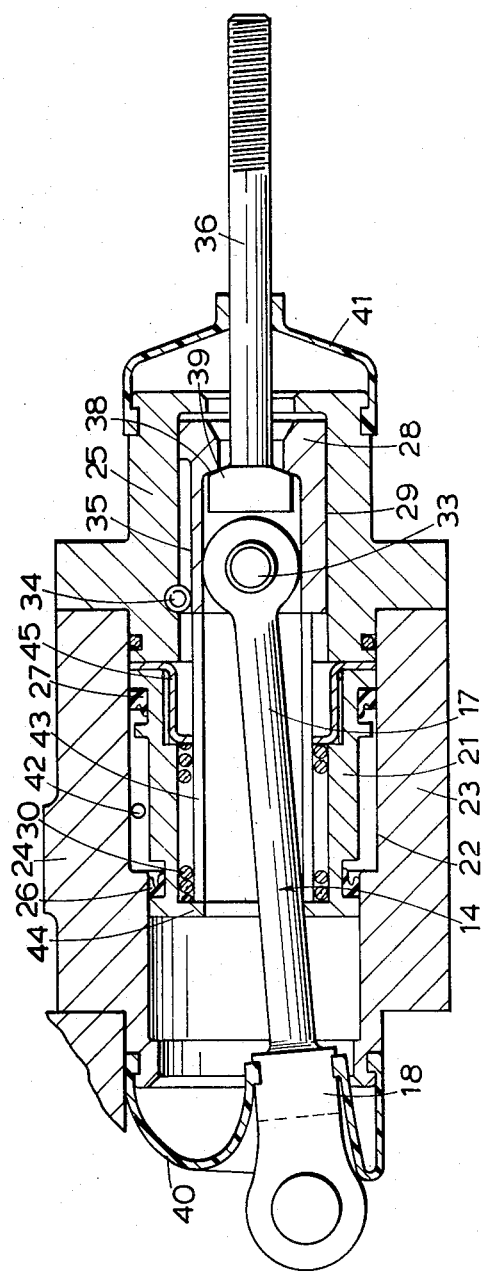
FIG. 5 is a longitudinal section of a further actuator assembly.

In the embodiment of FIG. 5 the spring 30 surrounds a sleeve 43 and acts between an inwardly directed radial flange 44 at the outer end of the piston 21 and an abutment ring 45 engaging with the outer end part 25 of the cylinder body 23. In this construction when the brake is actuated hydraulically, the piston 21 acts on the abutment member 28 through the sleeve 43, and the spring 30 acts only as a return spring for the piston 21.

The construction and operation of the actuator of FIG. 5 is otherwise the same as that described above and corresponding reference numerals have been applied to corresponding parts.

In the actuator of FIG. 6 the abutment member 28 is held against rotation by means of longitudinally extending pins 46 which project through bores in the abutment member 28 and at their ends adjacent to the piston 21 form an abutment for the abutment ring 45. The sleeve 43 is omitted and the piston 21 acts directly on the abutment member 28. The actuator is otherwise the same as that of FIG. 5, and corresponding reference numerals have been applied to corresponding parts.

In the actuator of FIG. 7 the abutment member 28 projects through the end part of the cylinder body 23 and a portion 47 of reduced diameter projects through an opening 48 in an end fitting 49 coupled to the pull-rod 36 through a pivotal connection 50. The portion 47 is screwed into a threaded bore in an enlarged head 51 having an inner bearing face of part spherical outline with which engages a complementary face 52 on the end fitting 49.

The construction and operation of the actuator of FIG. 7 is otherwise the same as that of FIG. 5 and corresponding reference numerals have been applied to corresponding parts.

The constructions described above with reference to FIGS. 3-7 of the drawings have the advantage of providing actuators in the form of substantially sealed units which can be detachably connected to the housing of a suitable brake with the free outer end of the inner part coupled to the brake applying means. Also rotation of the end part 25 with respect to the fixed part 24 alters the effective length of the pull-rod 14 to compensate for wear of the friction surfaces, externally and without having to dismantle the actuator or the brake itself.

I claim:

1. A disc brake comprising a relatively stationary housing, co-operating friction members located in said housing and having relatively rotatable friction surfaces, brake applying means for urging said friction surfaces into engagement, a first pull-rod projecting from said housing and acting on said brake applying means, hydraulic actuator means for moving said pull-rod in a brake applying direction such that it actuates said brake applying means, said hydraulic actuator means comprising an assembly of piston and cylinder members, one of said members being fixed rigidly with respect to said housing and having a bore, the other of said members being movable relative to said housing and acting on said first pull-rod, (and) a second pull-rod coupled axially to said first pull-rod in a brake applying direction for parking or emergency braking, and said first pull-rod comprises first and second parts and screw-threaded connecting means between said parts allowing relative rotation therebetween to alter the effective length of said first pull-rod, said connecting means and second part being located within said bore with seal means sealing said connecting means and said second part in said bore, and said fixed member includes external releasable rotating means for rotating said second part of said pull-rod relative to said first part.

2. A disc brake as claimed in claim 1, wherein said hydraulic actuator includes an abutment member with which said movable member is in freely separable engagement and which is coupled to said first pull-rod and guided for movement in a direction substantially at right angles to the axis of said brake, and a lost-motion connection, through which said second pull-rod is coupled to said abutment member.

3. A disc brake as claimed in claim 2, wherein said abutment member is keyed against rotation with respect to said fixed member, and pivotal thrust coupling means connecting said first pull-rod to said abutment member allow movement of said first pull-rod relative to said abutment member in one plane only of said brake.

4. A disc brake as claimed in claim 3, wherein said fixed member comprises a first part, and a second part releasable from said first part and to which said abutment member is keyed against rotation, said second part of said fixed member comprising said external releasable rotating means.

5. A disc brake as claimed in claim 2, wherein said fixed member comprises a cylinder having a stepped bore and said movable member comprises a stepped piston having a bore and working in said cylinder bore, said first pull-rod passing axially through said piston bore.

6. A disc brake as claimed in claim 5, wherein said abutment member of generally cylindrical outline has a stepped bore and works in said stepped bore of said fixed member adjacent to said piston, and resilient means acts so as to urge said abutment member and said piston into engagement.

7. A disc brake as claimed in claim 6, wherein said second pull-rod has an inner end extending into said bore of said abutment member at the end remote from its coupling with said first pull-rod, said second pull-rod having an enlarged head at its inner end, said bore of said abutment member having a shoulder at a step in diameter with which said head is engageable to prevent removal of said second pull-rod from said bore.

8. A disc brake as claimed in claim 7, wherein said engagement of said head of said second pull-rod with said shoulder comprises a part-spherical rocking coupling.

9. A disc brake as claimed in claim 6, wherein said abutment member projects out of the end of said fixed member, a hollow end fitting pivotally coupled to said second pull-rod receiving said projecting end of said abutment member, and an enlarged head is rigidly mounted on the end of the abutment member and engages an inner face of said end fitting so as to retain said end of said abutment member in said fitting.

10. A disc brake as claimed in claim 6 wherein said bore portion of said fixed member in which said abutment member is located is of greater diameter than said bore of said piston, said abutment member and said bore of said fixed member, respectively, having shoulders at steps in diameter between which said resilient means acts, so as to urge the abutment member into engagement with the piston, said resilient means comprising a compression spring.

11. A disc brake as claimed in claim 6, wherein a sleeve is located in the bore of said piston, said resilient means comprising a compression spring mounted on said sleeve, said piston having an inwardly directed radial flange at its end remote from said abutment member, said cylinder bore having a shoulder at a step in diameter, an abutment ring engaging said shoulder and said compression spring acting between said abutment ring and said radial flange.

12. A disc brake as claimed in claim 6, wherein longitudinally extending pins are fixed at one end of said fixed member, said abutment member having bores through which said pins project said pins comprising means for holding said abutment member against rotation with respect to said fixed member, said piston having an inwardly directed radial flange at its end remote from said abutment member, an abutment ring engaging the free ends of said pins adjacent to said piston and said resilient means comprising a spring acting between said radial flange and said abutment ring.

13. A disc brake as claimed in claim 1, wherein said rotatable friction members comprise rotatable friction discs, said housing having opposed radial surfaces and a stop abutment, expander means being located between said friction discs and operated by said first pull-rod to bring said friction discs into engagement with said opposed radial surfaces.

14. A disc brake as claimed in claim 13, wherein said expander mechanism comprises a pair of pressure plates having radially projecting lugs and in their adjacent faces having co-operating oppositely inclined recesses, balls being located in said recesses, and toggle links being connected between said lugs and connected together at a junction, said first pull-rod being connected to said junction of said links such that movement of said first pull-rod acts on said toggle links to move said pressure plates apart angularly in relatively opposite directions and into engagement with said friction discs, further movement of said first pull-rod acting to carry said friction discs round with said plates, said plates having stop lug means such that one of said plates is arrested by the engagement of its stop lug with said stop abutment in said housing, and means providing a servo action through the subsequent angular movement of the other of said plates.

15. A disc brake comprising a relatively stationary housing, co-operating friction members located in said housing and having relatively rotatable friction surfaces, brake applying means for urging said friction surfaces into engagement, a first pull-rod projecting from said housing and acting on said brake applying means, hydraulic actuator means for moving said pull-rod in a brake applying direction such that it actuates said brake applying means, said hydraulic actuator means comprising an assembly of piston and cylinder members, one of said members being fixed rigidly with respect to said housing, the other of said members being movable relative to said housing and acting on said first pull-rod, a second pull-rod coupled to said first pull-rod comprising means for moving said first pull-rod in a brake applying direction for parking or emergency braking, said hydraulic actuator including an abutment member of generally cylindrical outline which has a stepped bore and with which said movable member is in separable engagement and which is coupled to said first pull-rod and guided for movement in a direction substantially at right angles to the axis of said brake, and a lost-motion connection through which said second pull-rod is coupled to said abutment member, said fixed member comprising a cylinder having a stepped bore and said movable member comprising a stepped piston having a bore and working in said cylinder bore, said first pull-rod passing axially through said piston bore, said abutment member working in said stepped bore of said fixed member adjacent to said piston, with resilient means acting so as to urge said abutment member and said piston into engagement, and said second pull-rod has an inner end extending into said bore of said abutment member at the end remote from its coupling with said first pull-rod, said second pull-rod having an enlarged head at its inner end, said bore of said abutment member having a shoulder at a step in diameter with which said head is engageable to prevent removal of said second pull-rod from said bore.

16. A disc brake comprising a relatively stationary housing, co-operating friction members located in said housing and having relatively rotatable friction surfaces, brake applying means for urging said friction surfaces into engagement, a first pull-rod projecting from said housing and acting on said brake applying means, hydraulic actuator means for moving said pull-rod in a brake applying direction such that it actuates said brake applying means, said hydraulic actuator means comprising an assembly of piston and cylinder members, one of said members being fixed rigidly with respect to said housing, the other of said member being movable relative to said housing and acting on said first pull-rod, a second pull-rod coupled to said first pull-rod comprising means for moving said first pull-rod in a brake applying direction for parking or emergency braking, said hydraulic actuator including an abutment member of generally cylindrical outline which has a stepped bore and with which said movable member is in freely separable engagement and which is coupled to said first pull-rod and guided for movement in a direction substantially at right angles to the axis of said brake, and a lost-motion connection through which said second pull-rod is coupled to said abutment member, said fixed member comprising a cylinder having a stepped bore and movable member comprising a stepped piston having a bore and working in said cylinder bore, said first pull-rod passing axially through said piston bore, said abutment member working in said stepped bore of said fixed member adjacent to said piston, resilient means acting so as to urge said abutment member and said piston into engagement and said abutment member projecting out of the end of said fixed member, a hollow end fitting pivotally coupled to said second pull-rod receiving said projecting end of said abutment member, and an enlarged head is rigidly mounted on the end of the abutment member and engages an inner face of said end fitting so as to retain said end of said abutment member in said fitting.

* * * * *